United States Patent
Lang

(10) Patent No.: US 6,452,369 B1
(45) Date of Patent: Sep. 17, 2002

(54) OUTPUT CONTROLLED BUCK CONVERTER

(75) Inventor: Gerhard Lang, Altweilnau (DE)

(73) Assignee: Braun GmbH (DE)

(*) Notice: Subject to any disclaimer, the term of this patent is extended or adjusted under 35 U.S.C. 154(b) by 0 days.

(21) Appl. No.: 09/611,786

(22) Filed: Jul. 7, 2000

(30) Foreign Application Priority Data

Jul. 13, 1999 (DE) .......................... 199 32 379

(51) Int. Cl.⁷ ................................. G05F 1/40
(52) U.S. Cl. ........................ 323/285; 323/299
(58) Field of Search .................. 323/282, 285, 323/284, 299

(56) References Cited

U.S. PATENT DOCUMENTS

| | | |
|---|---|---|
| 4,428,015 A | 1/1984 | Nesler |
| 4,630,187 A | 12/1986 | Henze |
| 4,929,882 A * | 5/1990 | Szepesi ............ 323/222 |
| 5,359,281 A | 10/1994 | Barrow et al. |
| 5,498,995 A | 3/1996 | Szepesi et al. |
| 5,552,695 A | 9/1996 | Schwartz |
| 5,555,148 A | 9/1996 | Matsuzaki et al. |
| 5,563,781 A | 10/1996 | Clauter et al. |
| 5,568,347 A | 10/1996 | Shirai et al. |
| 5,734,259 A | 3/1998 | Sisson et al. |
| 5,926,383 A | 7/1999 | Pilukaitis et al. |
| 6,111,391 A * | 8/2000 | Cullen ............ 323/299 |

FOREIGN PATENT DOCUMENTS

| | | |
|---|---|---|
| DE | 33 43 883 | 6/1984 |
| DE | 3310678 | 10/1984 |
| DE | 3921955 | 1/1991 |
| DE | 19612365 | 10/1997 |
| EP | 0 090 237 | 10/1983 |
| EP | 0 617 501 | 9/1994 |
| EP | 0 752 748 | 3/1999 |
| FR | 2 610 149 | 7/1988 |
| GB | 2125641 | 3/1984 |
| JP | 60-32565 | 2/1985 |
| JP | 02168864 | 6/1990 |
| JP | 07015952 | 1/1995 |
| WO | 98/24170 | 6/1998 |
| WO | 99/13559 | 3/1999 |
| WO | WO 99/17434 | 4/1999 |

* cited by examiner

*Primary Examiner*—Shawn Riley
(74) *Attorney, Agent, or Firm*—Fish & Richardson P.C.

(57) ABSTRACT

A self-oscillating buck converter includes a controllable switch, a device for controlling the controllable switch, a device for sensing the output voltage of the buck converter, a device for sensing the output current of the buck converter, and a device for sensing the input voltage of the buck converter. The control device controls the controllable switch in such fashion that the output current level varies in dependence upon the output voltage and the input voltage.

8 Claims, 3 Drawing Sheets

OUTPUT CONTROLLED BUCK CONVERTER

BACKGROUND OF THE INVENTION

This invention relates to a direct-current converter, that is, a buck converter, with a controllable switch, with a device for controlling the controllable switch, and with a device for sensing its output current.

A buck converter, that is, a d.c. voltage down converter, is known from DE 196 12 365. The buck converter oscillates at a switching frequency predetermined by an oscillator. To maintain the converter's output voltage largely independently of the load, the output voltage is supplied to a control device controlling an electronic switch with a correspondingly adjusted pulse duty factor. In order to avoid that the current flowing through the coil exceeds a predetermined value, the control device additionally senses, by means of a sense resistor, the current flowing through the coil during the conducting period of the electronic switch, the current being interrupted by the electronic switch if necessary. This also prevents the output voltage from adopting an undesirably high value.

From DE 33 10 678 there is likewise known a d.c. voltage down converter which differs from the buck converter known from DE 196 12 365 referred to in the foregoing only in that it has no oscillator predetermining a switching frequency but is of the self-oscillating type: The electronic switch will be held conducting until the current flowing through the coil exceeds a limit value, and it will be held non-conducting until the output voltage has dropped below a specified value. From WO 98/24170 a self-oscillating buck converter is known whose oscillatory characteristics are determined only by its output voltage and which includes the added provision of a device with a sense resistor for limiting the coil current.

All buck converters identified are hence controlled by their output voltage. The current flowing through the coil can only be sensed when the electronic switch is closed, sensing in this connection serving only for current limiting purposes.

From DE 39 21 955 a switching controller is known whose power output is controllable. For this purpose the output voltage and the output current are sensed. However, the output current is only sensed when the electronic switch is open.

From EP 0 752 748 a buck converter for charging batteries is known. It includes an electronic switch and a current sense resistor sensing the current flowing through the coil and causing the electronic switch to be turned on and off when the battery voltage lies below a specified value, such that a time-averaged constant charging current results. When the battery is then recharged to a level at which its voltage exceeds the specified value, the electronic switch will be controlled in dependence upon the output voltage of the buck converter, such that the output voltage will be maintained constant.

From WO 99/13559 a self-oscillating buck converter is known whose output current is sensed by a current sense resistor and maintained at a constant level. However, with the input voltage rising, the output current rises correspondingly.

SUMMARY OF THE INVENTION

It is an object of the present invention to provide a buck converter of straightforward construction which is designed specifically for charging a storage battery, that is, which supplies a current adapted to the particular state of charge of the storage battery and the prevailing ambient conditions (temperature) irrespective of the input voltage prevailing at the particular instant. It is to be noted that a nearly fully charged storage battery is capable of taking up a small amount of current only whereas a nearly depleted storage battery can take up a comparatively large amount of current.

This object is accomplished in that the buck converter of the present invention includes a device which adjusts the output current level as a function of the respective output and input voltage. Considering that when the buck converter of the present invention is used for charging a storage battery, the output voltage of the buck converter is predetermined by the connected storage battery, reflecting the particular state of charge of the storage battery, the buck converter thus invariably supplies a current adapted to the particular state of charge of the storage battery.

A buck converter of the present invention includes a controllable switch, a device for controlling the controllable switch, a device for sensing the output voltage of the buck converter, and a device for sensing the output current of the buck converter. Through its input terminal the buck converter can be coupled to a power supply, for example. In a manner known in the art the buck converter operates to reduce the input voltage residing at its input terminal to a lower output voltage. Preferably a storage battery is connected to its output terminal. Because the battery voltage varies only very slowly during charging of the battery, the mode of operation of the buck converter of the present invention is first described for the case of a constant output voltage determined by the battery voltage.

The controllable switch, preferably an electronic switch, in particular a transistor, is controlled by the control device in a manner known in the art, that is, it is opened and closed in successive cycles. With the switch closed, that is, during the ON period of the transistor, a current flows from the input terminal through the switch and the coil to the storage battery, causing magnetic energy to be stored in the coil. With the switch open, that is, during the OFF period of the transistor, the magnetic energy is converted into electrical energy, causing a current to flow from the coil to the storage battery, in which process the circuit is closed via a diode in a manner known in the art. The device for sensing the output current of the buck converter of the present invention, preferably a current sense resistor, senses the output current of the buck converter during both the ON period and the OFF period of the electronic switch. The control device of the buck converter of the present invention will close the switch when the output current has dropped to a specified first value, and it will open the switch when the output current has risen to a specified second value. Because hence the buck converter of the present invention is controlled by its output current, this output current is independent of the magnitude of the input voltage. The buck converter of the present invention is, however, designed so that with the output voltage of the buck converter increasing, the first and the second specified value will change such that the switch remains open for a longer period than before, so that the time-averaged output current of the buck converter will decrease.

In a preferred embodiment the buck converter of the present invention is further configured in such fashion that also in the presence of a higher input voltage of the buck converter the first and the second specified value will change so that the switch remains open for a longer period than before. In this manner the so-called storage delay time of the electronic switch is compensated for, which in particular at large voltages needing to be switched causes a delayed opening of the switch and hence a larger output current than would be the case with an ideal buck converter. Therefore, operating the buck converter of the present invention at different input voltages poses no problems, since this does not affect the magnitude of its output current.

The buck converter of the present invention is preferably of the self-oscillating type, that is, it has no oscillator for controlling the opening and closing of the controllable switch. However, the buck converter of the present invention does possess a control input via which the buck converter can be switched off. This can be accomplished, for example, by means of a charge control device issuing a corresponding signal when a storage battery coupled to the buck converter has reached its fully charged condition.

In a buck converter affording particularly simple and hence economical construction, the invention makes provision for the control device to include a first comparator with hysteresis and a first reference voltage source. The hysteresis of the first comparator is produced in that the first reference voltage source supplies two different reference voltages, depending on whether the output of the first comparator is "low" or "high".

An advantageous buck converter further includes an arrangement for turning the buck converter off when the input voltage is too low to ensure proper operation of the buck converter, that is, when the voltage at the input terminals drops below a minimum input voltage, the buck converter will turn itself off automatically.

A buck converter which is particularly advantageous for charging a storage battery is configured according to the present invention so that its output resistance value is practically infinite at a low input voltage. This may be accomplished, for example, by opening at least one controllable switch disconnecting the output terminals from the buck converter circuit or preventing current flow between the output terminals. In this manner it is ensured that a storage battery coupled to the output terminals of the buck converter cannot be discharged through the buck converter when the input terminals of the buck converter are (accidentally) shortcircuited or when a voltage lower than the battery voltage resides at these terminals.

The present invention will be explained in the following with reference to several embodiments illustrated in the accompanying drawings. Further embodiments of buck converters of the present invention are dealt with in the description.

DETAILED DESCRIPTION OF THE DRAWINGS

Figure 1:
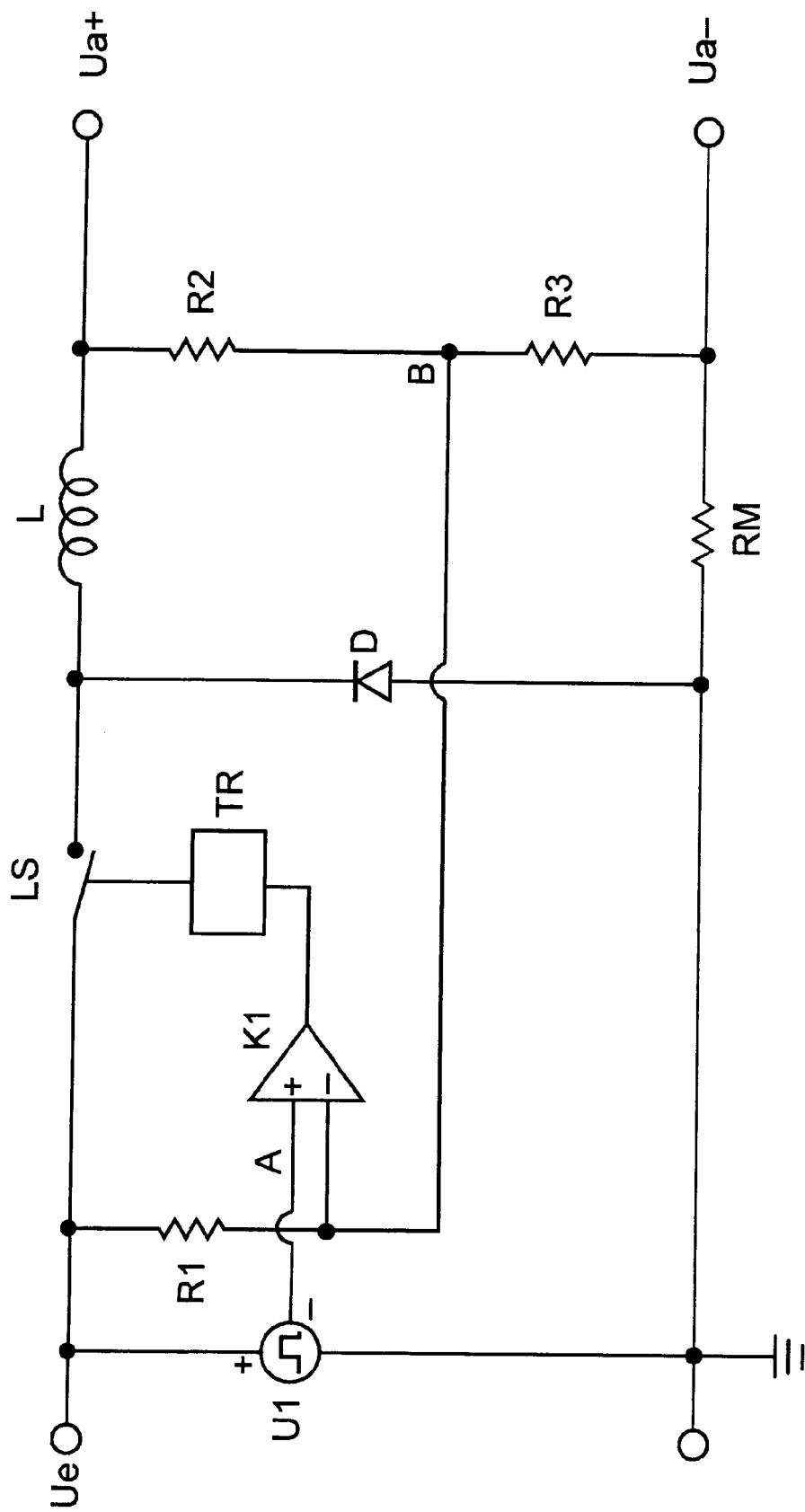
FIG. 1 is a block diagram of a buck converter of the present invention.

The buck converter of the present invention shown in FIG. 1 includes a controllable switch LS and a coil L connected in series between an input terminal Ue and a first output terminal Ua+ in a manner known in the art. The node between the controllable switch LS and the coil L is coupled to the cathode of a free-wheeling diode D. The anode of the free-wheeling diode D is connected to ground and to the one end of a current sense resistor RM. The current sense resistor RM has its other end connected to a second output terminal Ua−. A first resistor R1 is inserted between the input terminal Ue and a point B coupled via a second resistor R2 to the first output terminal Ua+ and via a third resistor R3 to the second output terminal Ua−. Point B is further connected to the inverting input of a first comparator K1 which has its output connected, via a driver TR, to a control input of the controllable switch LS. The first comparator K1 has its noninverting input coupled to a first reference voltage source U1 which is connected between the input terminal Ue and ground.

The first comparator K1 and the first reference voltage source U1 are interconnected in such fashion that the reference voltage Uref1 (point A) supplied by the first reference voltage source U1 adopts two different values, depending on whether the output of the first comparator K1 is "low" or "high", that is, the first comparator K1 has hysteresis because its breakover voltage (point A) has a different value than its reset voltage (point A). The potential prevailing at point B is of a magnitude which is determined by the voltage drops across resistors R1, R2, R3 and RM and is hence dependent on the input voltage, the output voltage and the output current. The input voltage is divided down by the first, the third and the current sense resistor, the output voltage by the second and third resistor. The first comparator K1 compares the voltage at point B with the voltage at point A. As long as the voltage at point B is lower than the voltage at point A, the output of the first comparator K1 is "high" and vice versa: The output of the first comparator K1 is "low" as long as the voltage at point B exceeds the voltage at point A.

Figure 2:
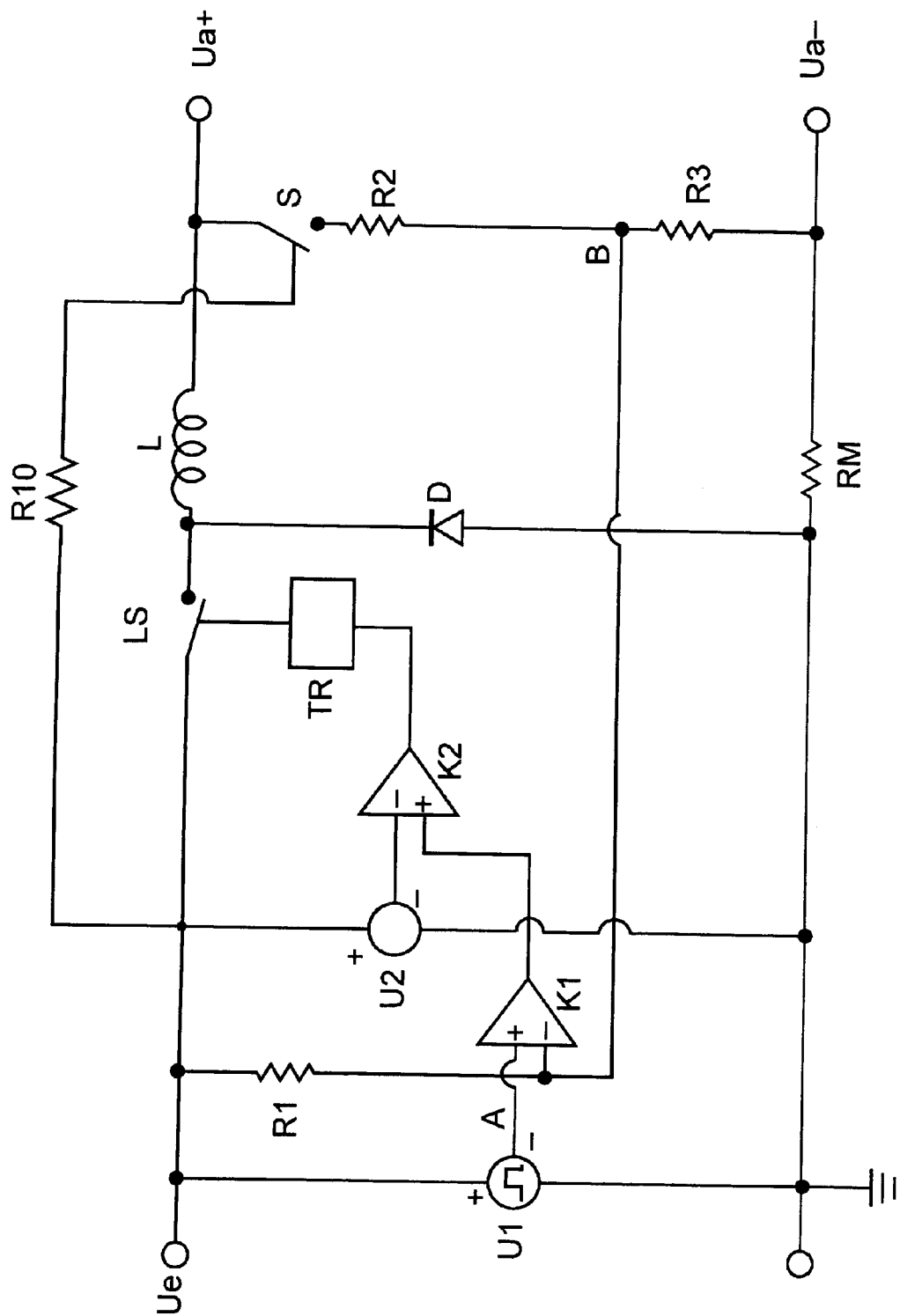
FIG. 2 is a block diagram of the buck converter of the present invention shown in FIG. 1, illustrating a preferred embodiment thereof.

A preferred embodiment of the buck converter of the present invention is illustrated in FIG. 2. This embodiment differs from the buck converter of the present invention shown in FIG. 1 by an arrangement for turning the buck converter off in the presence of a low input voltage and an arrangement for preventing a storage battery coupled to the buck converter from discharging through the buck converter in the presence of a low input voltage.

The arrangement for turning the buck converter off in the presence of a low input voltage includes a second reference voltage source U2 connected between the input terminal Ue and ground, as well as a second comparator K2 having its non-inverting input coupled to the output of the first comparator K1, while its inverting input is coupled to the second reference voltage source U2 and its output to the driver TR. The second comparator K2 compares the output voltage of the first comparator K1 with a second reference voltage Uref2 supplied by the second reference voltage source U2. When the input voltage is low, that is, when the input voltage lies below the second reference voltage Uref2, the output of the second comparator K2 will remain "low", causing the controllable switch LS to be maintained open via the driver TR and preventing the buck converter from oscillating. However, when the input voltage lies above the second reference voltage Uref2, the output voltage of the second comparator K2 will follow the output voltage of the first comparator K1, that is, the controllable switch LS will be controlled by the first comparator K1 via the second comparator K2 and the driver TR.

The arrangement for preventing the discharge of a storage battery connected to the buck converter through the buck converter in the presence of a low input voltage includes a second controllable switch S which is arranged between the second resistor R2 and the first output terminal Ua+ and has its control input coupled to the input terminal Ue via a tenth resistor R10. The second controllable switch S is preferably comprised of an electronic switch, for example, a transistor, having its base connected to the tenth resistor R10. When the input voltage is low, the second controllable switch S will be open, so that the output resistance value of the buck converter is practically infinite, preventing the storage battery from discharging through the second and third resistor R2, R3.

Figure 3:
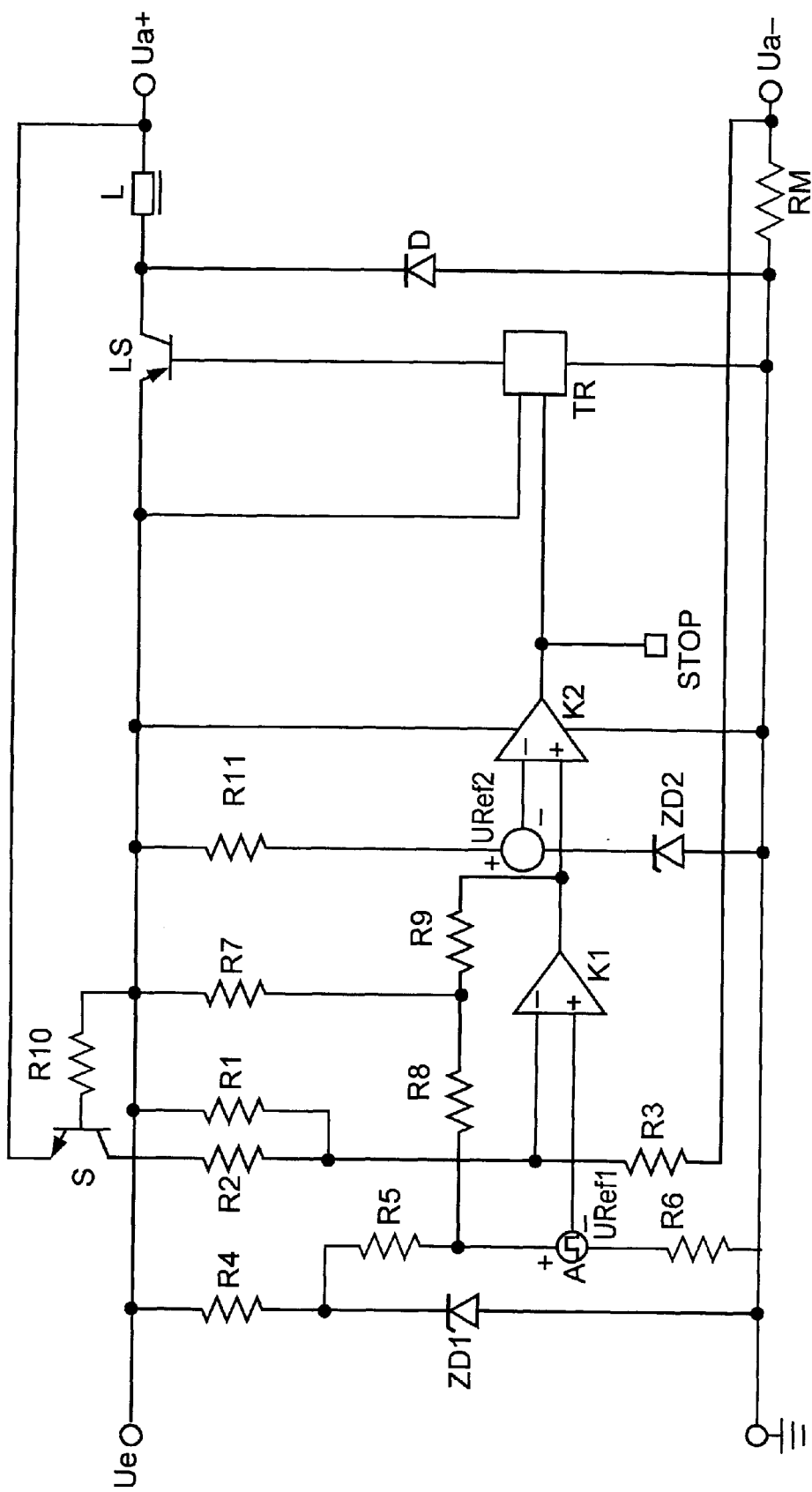
FIG. 3 is a circuit diagram of a buck converter of the present invention.

According to FIG. 3, the first reference voltage source U1 is comprised of a fourth, fifth and sixth resistor R4, R5, R6 connected in series between the input terminal Ue and ground, and of a first Zener diode ZD1 having its anode connected to ground and the one end of the sixth resistor R6, while its cathode is connected to the fourth and fifth resistor R4, R5. The sixth resistor R6 has its other end coupled to the non-inverting input of the first comparator K1 (point A) and the one end of an eighth resistor R8. The other end of the eighth resistor R8 is coupled, via a seventh resistor R7, to the input terminal Ue and, via a ninth resistor R9, to the output of the first comparator K1. The second reference voltage source U2 is comprised of a second Zener diode ZD2 having its anode connected to ground and its cathode to the inverting input of the second comparator K2 and, via an eleventh resistor R11, to the input terminal Ue.

The reference voltage Uref1 (point A) generated by the first reference voltage source is the Zener voltage divided down via the fifth and sixth resistor R5, R6 and produced from the input voltage via the fourth resistor R4 and the first Zener diode ZD1. As mentioned in the foregoing, it has two different values depending on whether the output of the first comparator is "low" or "high". When the output of the first comparator K1 is "high", the voltage at point A (breakover voltage) will be determined by the divided down Zener voltage and the input voltage divided down via the sixth, seventh and eighth resistor R6, R7, R8. By contrast, when the output of the first comparator K1 is "Blow", the ninth resistor R9 will be connected in parallel to the series circuit consisting of the sixth and eighth resistor R6, R8. Therefore, the voltage at point A (reset voltage) will be determined by the divided down Zener voltage and by the input voltage divided down via the sixth, seventh and eighth resistor R6, R7, R8 on the one hand and the seventh and ninth resistor R7, R9 on the other hand. The difference between the breakover and reset voltage is the hysteresis voltage. The seventh R7 and the ninth resistor R9 serve at the same time as pull-up resistors for the output of the first comparator K1.

As long as the output of the first comparator K1 is "low", that is, when the output voltage of the first comparator K1 does not exceed the reference voltage Uref2 of the second reference voltage source U2, the output of the second comparator K2 will equally be maintained "low". Hence the driver TR will not be driven, and the controllable switch LS will be maintained open. By contrast, when the output of the first comparator K1 is "high", that is, the output voltage of the first comparator K1 exceeds the reference voltage Uref2 of the second reference voltage source U2, the output of the second comparator K2 will be equally "high". This will cause the driver TR to be driven unless a turn-off signal is delivered to the output of the second comparator K2 via the Stop control input.

What is claimed is:

1. A buck converter for receiving an input voltage and controllably providing both an output voltage and an output current, the buck converter comprising:
    a controllable switch;
    a switch control device that controls the controllable switch;
    a first voltage sensing device that senses the output voltage of the buck converter;
    a first current sensing device that senses the output current of the buck converter; and
    a second voltage sensing device that senses the input voltage of the buck converter,
    wherein the switch control device is arranged to control the controllable switch in response to the output voltage, the input voltage and the output current, such that the output current changes inversely relative to changes in the output voltage.

2. The buck converter as claimed in claim 1, further comprising a circuit that turns the buck converter off when a low input voltage is sensed.

3. The buck converter as claimed in claim 1, further comprising a second controllable switch that opens when a low input voltage is sensed.

4. The buck converter as claimed in claim 3, wherein the switch control device includes a first comparator with hysteresis and a first reference voltage source.

5. The buck converter as claimed in claim 4, wherein a reference voltage supplied by the first reference voltage source adopts a first value if an output of the first comparator is low and adopts a second value if the output of the first comparator is high, said first value being different from said second value.

6. The buck converter as claimed in claim 5, wherein the buck converter is self-oscillating.

7. The buck converter as claimed in claim 6, further comprising a control input that allows the buck converter to be turned off.

8. The buck converter of claim 1, wherein the output current is sensed regardless of whether the controllable switch is open or closed.

* * * * *